United States Patent [19]

Goodson et al.

[11] Patent Number: 4,740,045

[45] Date of Patent: Apr. 26, 1988

[54] MULTIPLE PARAMETER DOPPLER RADAR

[75] Inventors: William D. Goodson; John R. Alden, both of Shawnee, Kans.

[73] Assignee: Goodson & Associates, Inc., Shawnee Mission, Kans.

[21] Appl. No.: 881,831

[22] Filed: Jul. 2, 1986

[51] Int. Cl.$^4$ ............................................. G01S 13/62
[52] U.S. Cl. .................................... 342/112; 342/114; 342/115; 342/173
[58] Field of Search ............... 342/109, 112, 114, 115, 342/173

[56] References Cited

U.S. PATENT DOCUMENTS

| | | |
|---|---|---|
| 2,705,303 | 3/1955 | Stinger . |
| 2,752,593 | 6/1956 | Downs . |
| 2,769,595 | 11/1956 | Bagley . |
| 2,834,956 | 5/1958 | Harris, Jr. . |
| 2,907,022 | 9/1959 | Kendall . |
| 2,967,449 | 1/1961 | Weiss . |
| 2,987,674 | 6/1961 | Shain . |
| 3,034,049 | 5/1962 | Downs . |
| 3,039,685 | 6/1962 | Bagley et al. . |
| 3,062,443 | 11/1962 | Palmer . |
| 3,070,745 | 12/1962 | Serson . |
| 3,118,139 | 1/1964 | Durstewitz . |
| 3,167,738 | 1/1965 | Westerfield . |
| 3,172,108 | 3/1965 | McClure . |
| 3,217,144 | 11/1965 | Hinnah . |
| 3,221,250 | 11/1965 | Wang . |
| 3,267,474 | 8/1966 | Greelee et al. . |
| 3,275,808 | 9/1966 | Knudsen . |
| 3,294,958 | 12/1966 | DuVall . |
| 3,304,504 | 2/1967 | Horlander . |
| 3,351,943 | 11/1967 | Bush et al. . |
| 3,365,716 | 1/1968 | Jorgensen . |
| 3,386,077 | 5/1968 | Molho . |
| 3,386,095 | 5/1968 | Stevens . |
| 3,396,544 | 2/1970 | Richmond et al. . |
| 3,412,334 | 11/1968 | Whitaker . |
| 3,412,400 | 11/1968 | Aker . |
| 3,420,988 | 1/1969 | Hunt et al. . |
| 3,432,687 | 3/1969 | Emmer . |
| 3,443,433 | 5/1969 | Liston et al. . |
| 3,445,840 | 5/1969 | Carlstead . |
| 3,471,278 | 10/1969 | Grien, Jr. . |
| 3,517,998 | 6/1970 | Pryor . |
| 3,522,602 | 8/1970 | Ver Planck . |
| 3,559,066 | 1/1971 | Pincus . |
| 3,581,196 | 5/1971 | Spaid . |
| 3,594,716 | 7/1971 | Waterman . |
| 3,621,391 | 11/1971 | Miller . |
| 3,689,921 | 9/1972 | Berry ................................. 342/115 |
| 3,706,096 | 12/1972 | Hammack . |
| 3,720,950 | 3/1973 | Vehrs, Jr. . |
| 3,725,916 | 4/1973 | Cutler . |
| 3,750,172 | 7/1973 | Tresselt ........................... 342/112 X |
| 3,769,583 | 10/1973 | Spencer . |

(List continued on next page.)

OTHER PUBLICATIONS

*Radars*, D. K. Barton 1980.
*Microprocessors*, Motorola, Inc. 1981.

Primary Examiner—T. H. Tubbesing
Attorney, Agent, or Firm—Wm. Bruce Day

[57] ABSTRACT

A multiple parameter doppler radar system transmits a radar signal which is alternated between a first and second frequency toward a target. The doppler shifted signals reflected from the target are received and processed to derive a pair of doppler signals related respectively to the first and second frequency signals. The frequency of one of the doppler signals is measured and scaled to a target speed. The phase magnitude between the two doppler signals is measured and scaled to a target range. The phase lead/lag relationship of the two doppler signals is detected to determine if the target is moving toward or away from the radar system. The components of the system are controlled by a microprocessor which is programmed to perform quality determinations on the data derived from the signals to assess the reliability of the data even in a multiple target environment prior to displaying the parameters of target motion.

33 Claims, 5 Drawing Sheets

U.S. PATENT DOCUMENTS

| | | |
|---|---|---|
| 3,786,504 | 1/1974 | Collins . |
| 3,851,299 | 11/1974 | Wood . |
| 3,870,992 | 3/1975 | Hanna, Jr. . |
| 3,898,655 | 8/1975 | Tresselt ................... 342/112 X |
| 3,912,915 | 10/1975 | Kalb et al. . |
| 3,936,824 | 2/1976 | Aker et al. ................. 342/115 |
| 3,939,461 | 2/1976 | Parvulescu . |
| 3,958,243 | 5/1976 | Linder . |
| 3,978,481 | 8/1976 | Angwin et al. ............ 342/112 X |
| 4,020,490 | 4/1977 | Millard ..................... 342/173 X |
| 4,052,722 | 10/1977 | Millard ..................... 342/173 X |
| 4,070,634 | 1/1978 | Barker et al. . |
| 4,079,377 | 3/1978 | zur Helden et al. ........ 342/109 |
| 4,104,912 | 8/1978 | Clavelloux . |
| 4,214,243 | 7/1980 | Patterson .................. 342/115 |
| 4,219,878 | 8/1980 | Goodson et al. . |
| 4,236,140 | 11/1980 | Aker et al. ................. 342/115 |
| 4,335,382 | 6/1982 | Brown et al. .............. 342/104 |
| 4,335,383 | 6/1982 | Berry ........................ 342/115 |

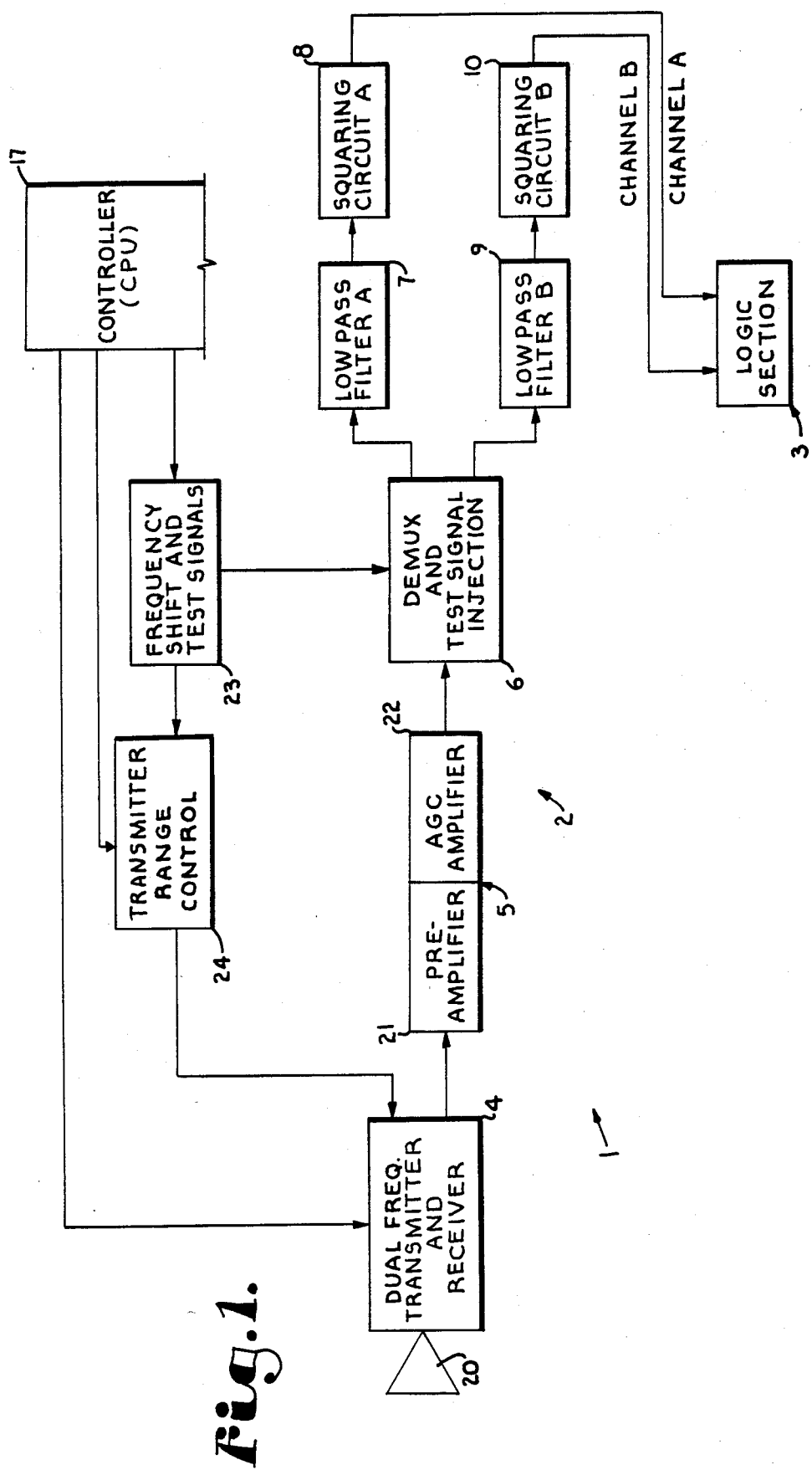

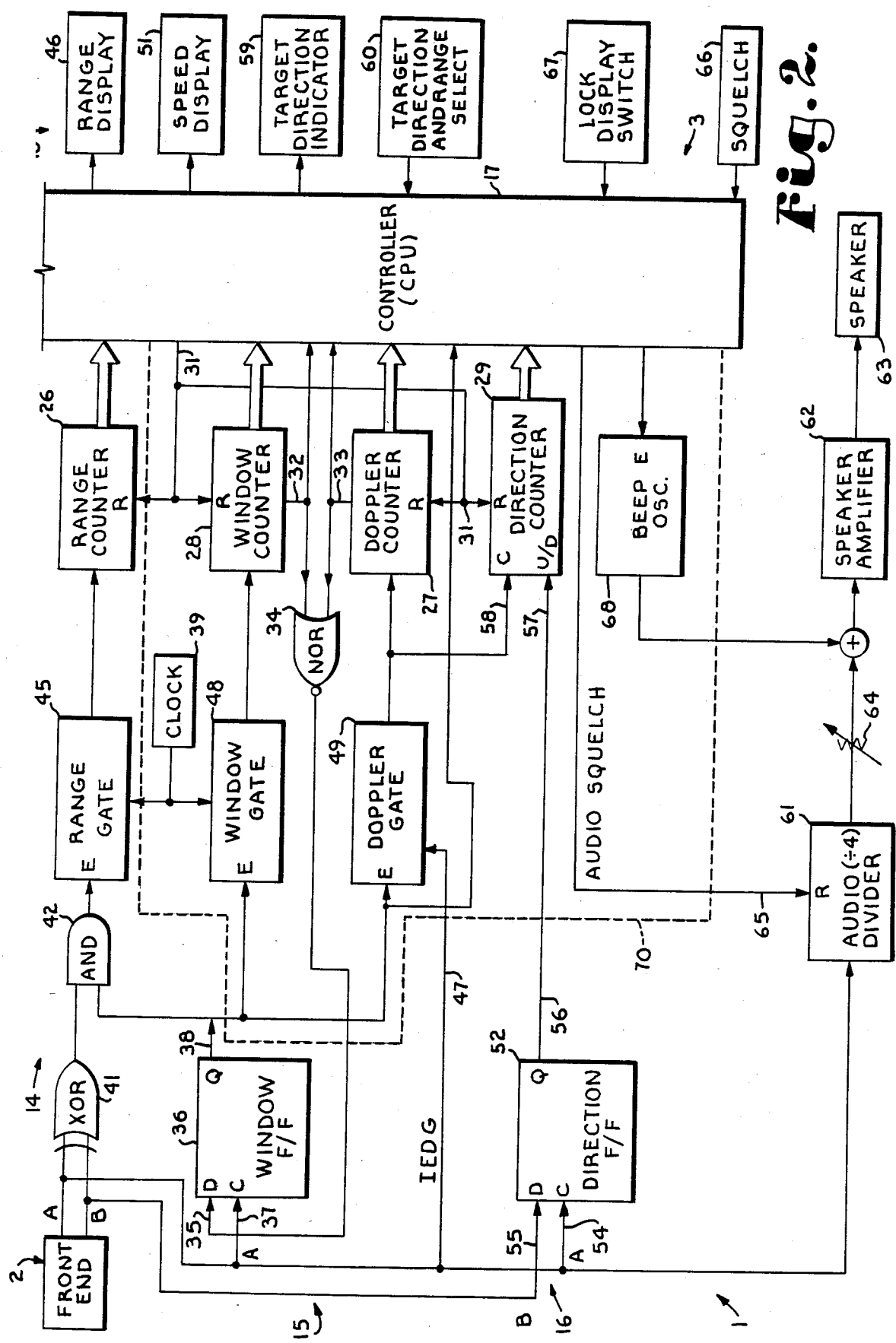

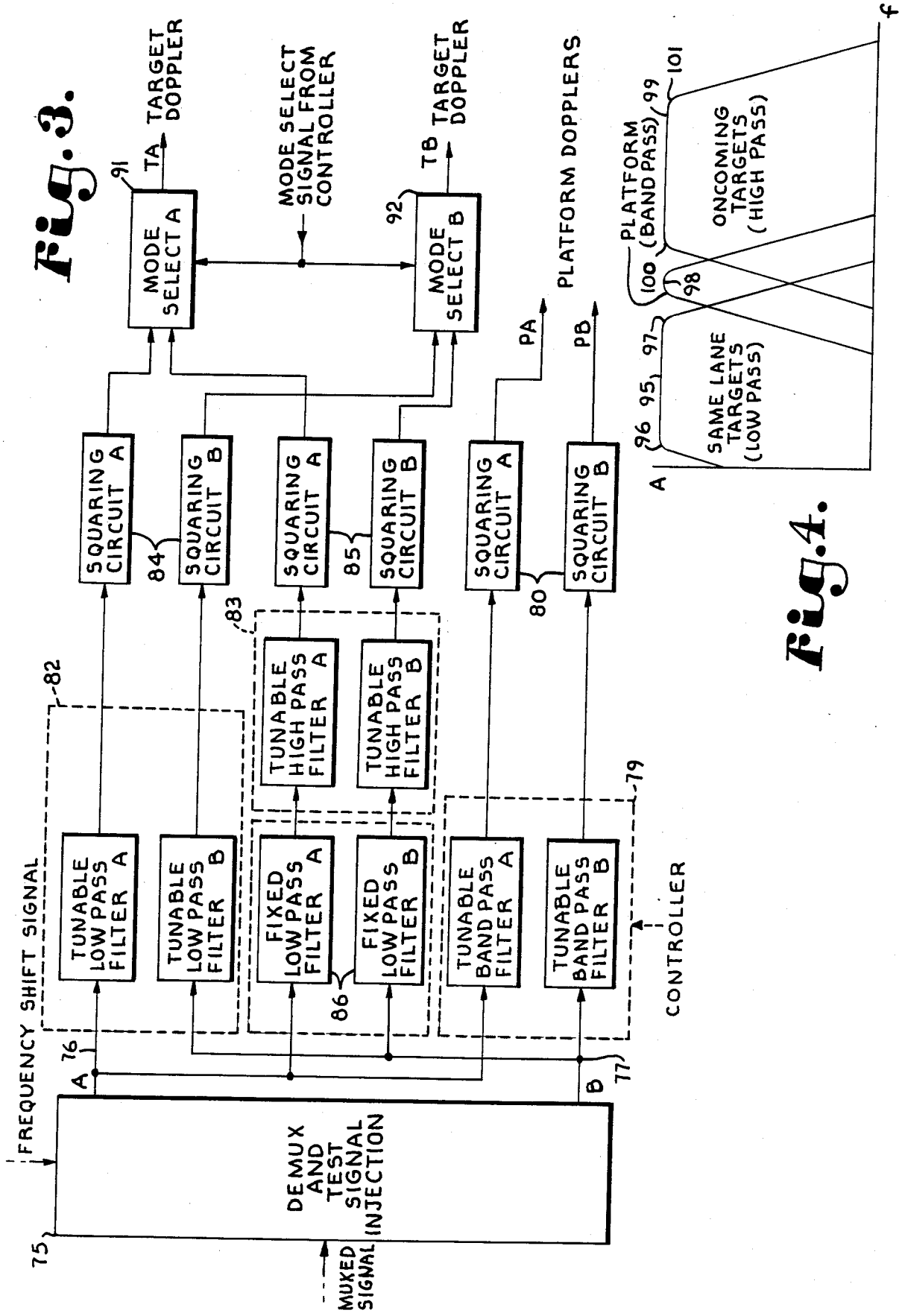

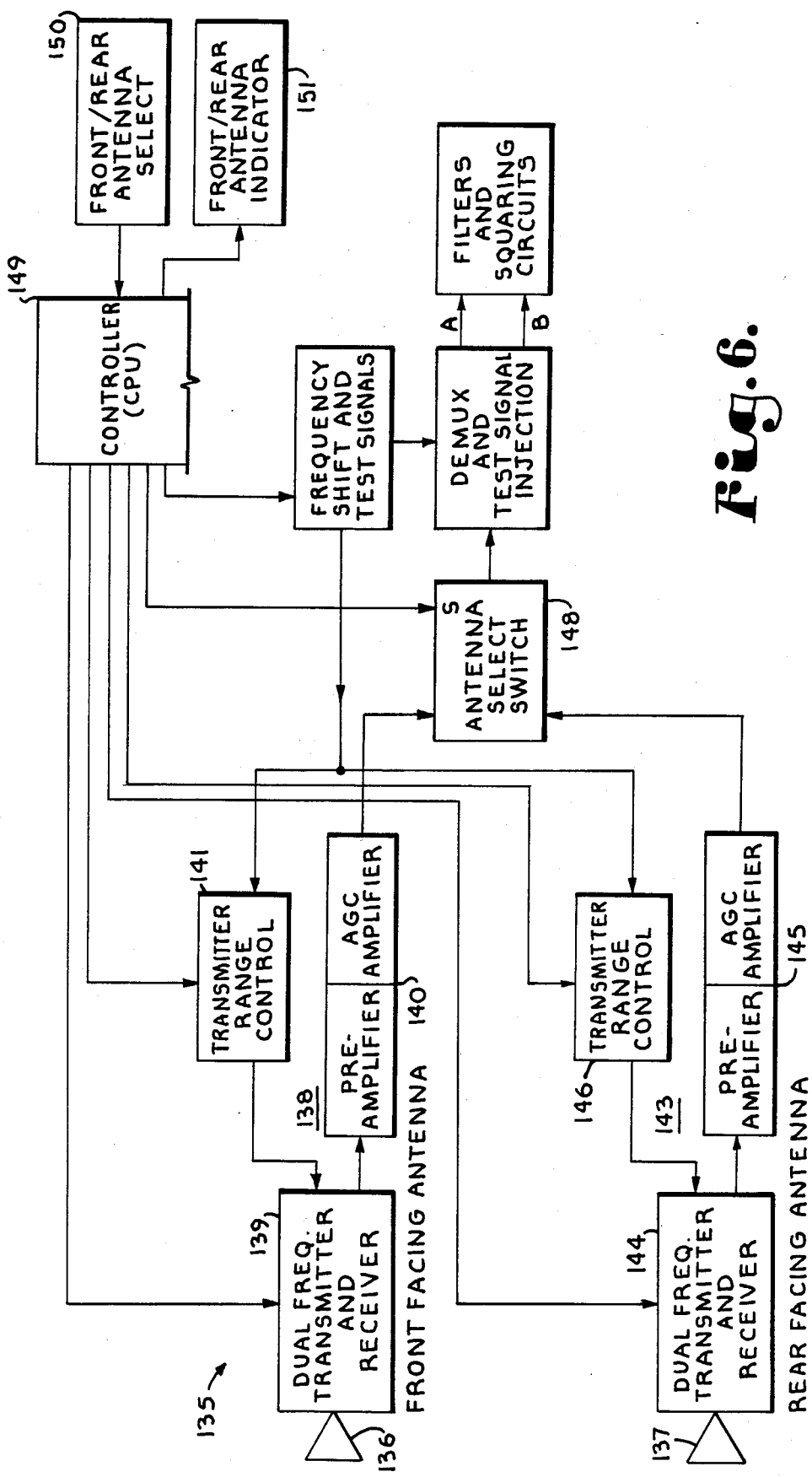

MULTIPLE PARAMETER DOPPLER RADAR

FIELD OF THE INVENTION

The present invention relates to non-pulsed doppler radar systems and, more particularly, to such a radar system which is capable of determining the speed, range, and relative direction of movement of a target.

BACKGROUND OF THE INVENTION

One of the principal tools for the enforcement of vehicle speed limit laws has been doppler radar. In a doppler radar system, a microwave frequency signal is reflected from a target vehicle, causing a change in the frequency of the signal in proportion to a component of the velocity of the vehicle. The frequency shift is measured and scaled to miles per hour or other dimensional units and is displayed. Since no computations are required of the unit operator, the vehicle speed measurement is quick and simple. In theory, the officer only needs to observe the passing traffic, monitor the unit display and, if an excessive speed is displayed, pursue and issue a citation to the violator.

In practice, a problem arises in the identification of the vehicle whose speed is being displayed when more than one vehicle is in a position to reflect the radar signal. The signal beam of conventional police radars is generally conical, spreading at about six degrees from an axis of the antenna. As the range from the antenna increases, the width of the beam increases such that more targets may be illuminated by the radar signal. For this reason, it is not possible to precisely aim the antenna at a target unless the target is within a relatively short range. It would be possible to narrow the beam by increasing the diameter of the antenna. However, this is not considered a viable solution because of increased expense and decreased convenience. In all present day police radar systems, the range control is actually a receiver sensitivity control. If an operator adjusts a range control to limit the range, he is actually decreasing the sensitivity of his unit. If, however, a truck or other vehicle with a large radar cross section approaches, the officer may read the speed of this target at a range much greater than he expects.

Another aspect of the identification problem is based on the difficulty for even an experienced operator to judge precisely which of a number of vehicles is likely to be the best radar signal reflector. Certain structures and configurations such as headlights, certain grills, license plates, large flat metal surfaces, and the like are relatively efficient radar signal reflectors. When these structures are variously combined in a vehicle and a plurality of such vehicles are positioned at random distances from a radar antenna, the number of geometric variables decreases the reliability of target identification on the basis of target reflectivity.

The majority of radar units in current use by police departments are designed for use in a moving mode, that is, with the radar unit in motion while monitoring the speed of vehicles traveling in the opposite lane moving in the opposite direction from the platform. There have been attempts at designing moving radar units capable of use in a same-lane moving mode, with varying degrees of nonsuccess. In any moving mode radar unit, the speed of the patrol car or platform vehicle and the speed of target relative to the platform are measured and then mathematically combined in such a manner as to result in the absolute or ground speed of the target. In standard (opposite lane) moving mode radars, the doppler signals representing the platform speed and the relative target speed are separated from the return signal by means of filters. A problem arises in correctly combining the platform and relative target speeds. A same-lane moving mode radar unit can be used to measure the speed of oncoming of "opposite lane" targets or "same lane" targets.

Oncoming target speeds measured by standard moving radar are simpler to measure since with such targets the platform speed is always subtracted from the relative target speed to derive the absolute target speed. However, oncoming target radars have limited utility, and their use presents safety problems. The officer has to make a hazardous U-turn to pursue a violator, after which he is no longer capable of measuring the target's speed with the radar unit.

The use of same-lane moving radar units generally requires the capability of measuring the speed of closing targets wherein the distance between the patrol car and the target is decreasing and the speeds of opening targets in which the target is pulling away from the patrol car. In a closing situation the relative target speed is subtracted from the platform speed, while in an opening situation the relative target speed is added to the platform speed. Since the mathematical handling of the speeds is different for the different situations, a switch on the radar unit is necessary to signal the desired mode. In operation, the officer is required to observe the target and set the switch in the proper position for target situation. However, if the officer selects the wrong mode or the situation changes because either the patrol car or target changes speed or a second target is present, an erroneous speed can be displayed.

In addition to the problems described above which are inherent in present day moving mode radar systems, such systems also suffer the same target identification problems as stationary mode radars. Because of these problems in addition to increased expense because of greater complexity, police departments have been reluctant to acquire same lane moving mode radar systems.

Thus, while conventional police doppler radar units are capable of a high degree of accuracy with regard to vehicle speed measurements, great care must be exercised in the use of such units as far as attributing the speed displayed by a radar unit to the driver of a particular vehicle. There is a common, although often mistaken, assumption that a radar unit displays the speed of a vehicle in the front of a group of vehicles, particularly one that is spaced ahead of a group. While it is true that situations occur in which an officer can easily discern which of a group of vehicles might be speeding, there are many vehicle grouping situations in which the identity of the vehicle whose speed is displayed is indeterminate. Most citizens seldom have contact with law enforcement agencies. When such contact occurs, it is important that the citizens feel that they have been dealt with justly. Therefore, it is important that any traffic citations written be based on factual information that is associated with the correct car. Traffic citations and arrests based on assumptions which are often false leave authorities vulnerable to undesirable allegations of arbitrary and selective enforcement of the traffic laws.

One important factor which must be considered in the design of police radar units is economics. Whereas a radar unit or system which costs tens or hundreds of thousands of dollars might be considered commensurate with the needs and costs of an aircraft or ship, such a cost would be prohibitive to a city, county, or state government. Thus, the capabilities of a police radar unit must be strictly limited to what can be afforded by such governments without sacrificing accuracy and reliability.

SUMMARY OF THE INVENTION

The present invention provides doppler radar methods and apparatus which greatly increase the capability of identifying which of a plurality of target vehicles is being monitored by a radar unit by determining and displaying the target range and the relative target direction of movement in addition to the target speed. This is accomplished by: continuously transmitting a radar signal whose frequency is toggled beween two frequencies; extracting a pair of doppler signals phase related respectively to the two frequencies from the received signals; determining the magnitude of phase difference between the two doppler signals and scaling the phase magnitude to a target range; determining the doppler frequency on one or both of the doppler signals and scaling the doppler frequency to a target speed; and determining the phase lead/lag relationship between the two doppler signals and converting the phase relationship to an indication of whether the target vehicle is approaching or moving away from the radar unit. In addition to making such measurements, each measured parameter is analyzed to determine its quality and reliability before displaying such a parameter. By measuring the range and relative direction of motion of a target, a traffic officer is greatly aided in determining which vehicle is being monitored thus providing stronger evidence than heretofore available if a traffic citation is issued on the basis of speed measurements made using the methods and apparatus of the present invention.

The invention includes a second embodiment adapted for measuring the speeds of targets from a moving platform vehicle. The moving mode radar unit measures the speed and direction of the platform as well as the range, relative speed, and relative direction of the target. The platform speed and relative target speed are mathematically combined in a manner determined by the relationship of the platform direction and the target direction and the change in range to result in the true speed of the target. As in the stationary mode radar unit, the officer is aided greatly in target identification by the display of the target range and direction.

OBJECTS OF THE INVENTION

The principal objects of the present invention are to provide an improved radar system for determining the speed of road vehicles; to provide such a system which greatly increases the capability of identifying the vehicle being clocked; to provide such a system which reports the target range and whether a target vehicle is approaching the system or moving away in addition to the speed of the vehicle; to provide such a system which determines the range, speed, and direction of a target over a window period the length of which varies in relation to the speed of the target and the beginning and end of which is synchronized with the rising edges of the pulses of a doppler signal derived from target reflected signals; to provide such a system which can be set to monitor only vehicles approaching or only vehicles moving away from the system; to provide such a system which can be set to monitor traffic within selected target range limits; to provide such a system which assesses the quality of data derived from target reflected signals and which displays target parameters only if the data from which such parameters were derived indicate a selected degree of reliability; to provide such a system which prevents the computation and display of the speed of one vehicle and the range of a different vehicle; to provide such a system which employs digital logic circuitry and a microprocessor for computing target motion parameters from the target reflected radar signals; to provide such a system which does not require complex calibration procedures by the user of the system; to provide such a system which automatically switches between a long range mode and a short range mode and intermediate range modes depending on the detected range of the target vehicle to increase the accuracy of the target parameter measurement; to provide a modification of such a system which is operable from a moving platform vehicle and which includes apparatus for measuring the speed and direction of the platform vehicle with respect to the roadway and operation routines to properly combine the target and platform speeds according to the relationship between the target and platform directions; and to provide such a system which is economical to manufacture, accurate and reliable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a block diagram illustrating a front end portion of a radar system according to the present invention including a dual frequency radar transceiver and circuitry for deriving a pair of doppler signals containing information related to the parameters of motion of a target vehicle.

FIG. 2 is a block diagram illustrating a logic portion of the radar system for deriving the target speed, range, and relative direction of motion from the doppler signals.

FIG. 3 is a block diagram illustrating a filter arrangement to derive the speed of a radar unit platform vehicle for use of the radar system according to the present invention in a moving mode.

FIG. 4 is a graph on which the frequency response curves of the filters of FIG. 3 are superimposed.

FIG. 6 is a block diagram illustrating an alternative embodiment of a front end portion of a moving mode radar system employing front and rear facing transceivers.

DETAILED DESCRIPTION OF THE PREFERRED EMBODIMENT

Figure 5:
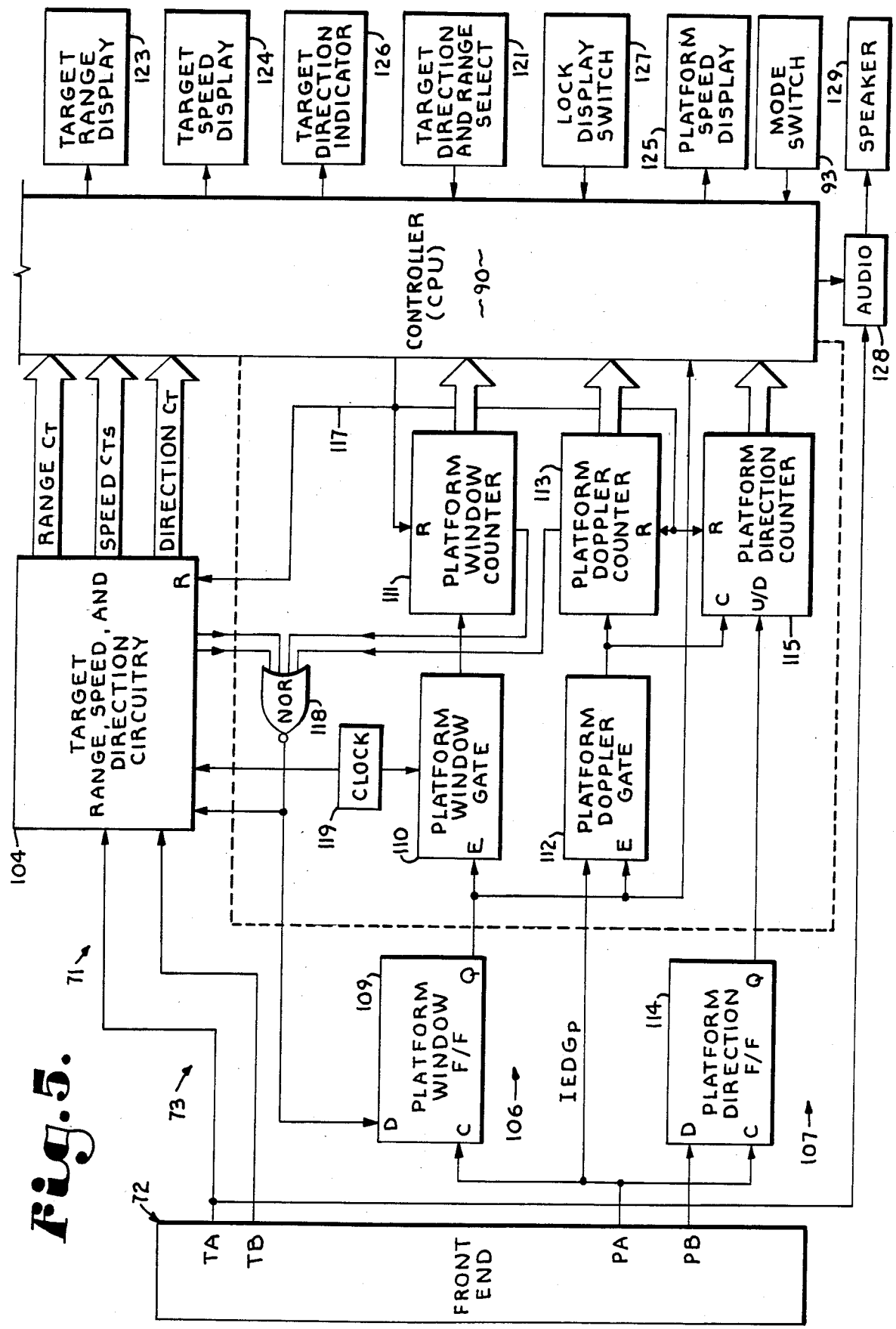
FIG. 5 is a block diagram illustrating a logic portion of a moving mode radar system according to the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a multiple parameter doppler radar system according to the present invention including a front end portion 2 (FIG. 1) and a logic section 3 (FIG. 2). The front end portion 2 generally includes a dual frequency radar transceiver 4, doppler signal amplifiers 5, a demultiplexer (demux) 6, a channel A filter 7 and squaring circuit 8, and a channel B filter 9 and squaring circuit 10. The logic section 3 generally includes target range measuring circuitry 14, target speed measuring circuitry 15, target relative direction measuring circuitry 16, a controller or central processing unit (CPU) 17, and target parameter displays 18.

In general, the radar system 1 continuously transmits a radar signal toward a vehicle or group of vehicles which is reflected back to the transceiver 4. The received signal, including doppler components related respectively to the two frequencies at which the transmitter portion is operated, is down converted to recover the doppler frequency components. The A and B doppler components are separated by the demultiplexer 6 then the A and B doppler signals are filtered and squared. The range circuitry 14 determines the target range by measuring the magnitude of the phase angle between the A and B doppler signals. The speed circuitry 15 determines the target speed by measuring the period of a plurality of doppler cycles of one of the doppler signals, such as doppler signal A. The direction circuitry 16 determines the relative target direction, or whether the target vehicle is approaching or moving away from the system 1, by determining the phase lead/lag relationship between the A and B doppler signals. The controller 17 controls the operation of the front end section 2 and the logic section 3 and, in addition, performs scaling and quality assessment functions on the data derived by the target parameter measuring circuits 14, 15 and 16. The scaled target motion parameters are displayed on the displays 18 in desired dimensional units.

Referring to FIG. 1, the transceiver 4 is substantially conventional. Therefore, most of the details of the components and construction thereof are omitted although differences in the manner of operation in the system 1 are disclosed. The transmitter section of the transceiver 4 is preferably a conventional Gunn diode oscillator which includes a varactor diode in the oscillator cavity. The frequency of oscillation of the Gunn diode is varied by the voltage on the varactor diode. In the system 1, a square wave signal is applied to the varactor diode to cause the Gunn oscillator to shift or alternate between two frequencies, an A frequency and a B frequency. The frequency difference is inversely related to the relative phase-to-range relationship of the received doppler signals. In the system 1, the frequency difference may be on the order of several tens of kilohertz to several hundred kilohertz. Using this technique, phase continuity through the transition between the two Gunn oscillator frequencies is maintained. The square wave modulating frequency is required to be at least twice the highest expected doppler frequency in order to accurately recover the doppler signals. While the illustrated transceiver 4 is disclosed as employing a Gunn diode oscillator, the system 1 is not limited to such an arrangement. As faster transistors become available, it might be preferable to use a transistor oscillator with the likely advantages of greater efficiency and better amplitude modulation (AM) and frequency modulation (FM) stability. The transceiver 4 operates in the K-band, although the system 1 is not limited to K-band operation.

The transmit signal is coupled to an antenna such as a horn antenna 20 through what is known as a turnstile duplexer. The duplexer also couples received energy from the horn 20 to a receiver mixer diode. Some transmit signal is allowed to leak across the duplexer and functions as a local oscillator signal which is mixed with the received signal. The result of this down conversion is a signal having an A doppler component related to the interaction of the A frequency radar signal with a target and time multiplexed with a B doppler component similarly related to the B frequency radar signal.

The doppler signal amplifiers 5 include a preamplifier 21 and an automatic gain control (AGC) amplifier 22. The preamp 21 is a low noise, fixed gain amplifier. The AGC amplifier 22 automatically varies its gain to maintain a substantially constant output level, regardless of target size or distance. This gives weak signals added amplification while preventing strong signals from overdriving and causing uncontrolled clipping or limiting in subsequent circuits. Clipping can change the zero crossing points of the waveform, and it is the relationship of the zero crossings of the A and B doppler signals which contains the target range and direction information.

The demultiplexer circuit 6 receives the signal from the AGC amplifier 22 and alternately applies it in a sample and hold manner to the channel A or channel B filters 7 or 9 as determined by substantially the same square wave signal which controls the frequency shifting in the transmitter portion of the transceiver 4. Thus, channel A receives the composite doppler signal only while the transmitter is transmitting at the A frequency, and channel B only receives the doppler signal while the transmitter is operating at the B frequency. In actuality, for a short time after the transmit frequency shifts, the receiver output consists of the doppler shifted old transmit frequency beating against the new transmit frequency acting as the local oscillator. While this would be outside the passband of the filters 7 and 9, it could be seen as noise to them. Therefore, in the demultiplexer 6, each channel switching action is delayed to allow propagation time for the new reflected signal to arrive back at the receiver after each frequency shift. The delay only occurs at the beginning of the period that the multiplexed signal is applied to the appropriate filter set. At the end of the period, the multiplexed signal is made unavailable to the filters simultaneously with the switch to the other transmitter frequency.

The square wave signal which shifts the transmitter frequency and which controls the channel switching in the demultiplexer circuit 6 originates in a frequency shift circuit 23. The circuit 23 includes a crystal controlled oscillator and a digital divider which cooperate to generate a square wave signal of the desired frequency. The square wave signal as applied to the demultiplexer circuit 6 is delayed as described above. As applied to the transmitter section of the transceiver 4, the square wave signal passes through a transmitter range control circuit 24 which controls the amplitude of the frequency shift signal. As will be explained in more detail below, the transmitter range control circuit 24 provides a short range amplitude and a long range amplitude as determined by a logic signal from the controller 17 and may be adapted to provide numerous intermediate range amplitudes. The circuit 23 also may be controlled by the CPU 17 to inject a test signal into the demultiplexer circuit 6 or the preamp 21 for automatic system testing.

The filters 7 and 9 are preferably monolithic switched-capacitor low-pass filters matched for equal delay or phase shift in the passband. Discrete filters or elliptical type filters could also be employed with the advantage of less electrical noise but the disadvantage of more integrated circuits. The outputs of the filters 7 and 9 have essentially the same frequency, representing the target velocity, but differ in phase magnitude and phase lead/lag relationship representing respectively the target range and the relative direction of target movement. The filters must be matched, or the phase errors compensated for in some other ways, because phase errors cause an offset in measured distance or direction. Unmatched filters could be used if the phase errors are compensated for in the software of the controller 17 or in some other way. Tunable or self-tuning (tracking) narrow-band bandpass filters could also be used to improve the signal-to-noise ratio which would improve range and target tracking at the possible expense of frequently tracking and displaying speeds of vehicles other than the vehicle closest to the radar system 1 without CPU intervention. The principal purpose of the filters 7 and 9 is to remove the channel switching frequency component from the A and B doppler signals which is introduced in the demultiplexing circuit 6. In addition, the filters remove all frequencies above half the switching frequency. The effect is to smooth the sinusoidal waveform of the doppler signals.

The squaring circuits 8 and 10 convert the output signals from the filters 7 and 9 to square waves for use in the logic section 3 of the system 1. Each sine wave is first amplified in a clipping amplifier which has high gain for low amplitude signals and unity gain for high amplitude signals. The outputs from the clipping amplifiers are clipped sine waves which are input to respective comparators that complete the squaring process. The squaring circuits 8 and 10 are matched for equal phase shift or propagation delay therethrough.

Referring to FIG. 2, the logic portion 3 of the radar system 1 receives the squared A and B doppler signals and processes them to recover the target range, speed, and relative direction. In general, the doppler signals are digitally combined in the range circuitry 14 to isolate range pulses having pulse widths proportional to the target range. The range pulses are used to gate clock pulses to a range counter circuit 26 which is read by the controller 17. In the speed circuitry 15, the pulses of one of the doppler signals are counted by a doppler counter 27 during a period of time established principally by a window counter 28 to determine the doppler cycle period for a plurality of doppler cycles and thereby derive the target speed. In the direction circuitry 16, the doppler signals control components including a direction counter 29 whereby the count produced by the counter 29 gives an indication of phase relationship between the doppler signals and, thus, an indication of the relative direction of movement of the target vehicle.

The calculation of the target motion parameters by the controller 17 is based on a variable "window" or calculations time period measured by the window counter 28. The use of a variable window increases the sampling accuracy over the range of detectable target speeds compared to the accuracy obtainable using a fixed window. The window period beginning is enabled by a reset signal on a reset line 31 from the controller 17, the reset signal also being applied to the range, doppler, and direction counters 26, 27, and 29. The window period begins on the next rising edge of the A doppler signal. The window period end is enabled by either the window counter 28 reaching a selected terminal window count or by the doppler counter 27 reaching a selected terminal doppler cycle count. Either of these two conditions causes a selected logic level to be placed on a respective countout terminal 32 of the window counter 28 or terminal 33 of the doppler counter 27. The countout terminals 32 and 33 are connected through a NOR gate 34 to a data input 35 of a window flip-flop 36 which coordinates the window period with the rising edges of the A doppler signal. The A doppler signal is applied to a clock input 37 of the flip-flop such that after the NOR gate 34 signals that a window period is enabled to begin by going to logic one, the first rising edge of the A doppler signal causes the output 38 to go to logic one thereby signalling subsequent circuitry that a window period is active. When the output of the NOR gate 34 goes to logic zero at the end of a window period, the output 38 of the window flip-flop goes to logic zero on the next rising edge of the A doppler signal thereby ending the window. During the window period, clock pulses from a clock circuit 39 are gated to the window counter 28 to time the window or calculation period.

In the range circuitry 14, an exclusive-OR (XOR) gate 1 receives the squared A and B doppler signals and combines them to derive phase difference pulses. The output of the XOR gate 41 is a logic one level when the A and B doppler signals are different and a logic zero level when the doppler signals are the same. The waveform of the output of the XOR gate 41 is a series of sets of pulses, each set including a phase difference pulse between the rising edges of the pulses of the A and B doppler signals and a substantially similar phase difference pulse between the falling edges thereof. Each of these pulses has a pulse width proportional to the instantaneous range of the target from the system 1, and the pulses are therefore, termed range pulses.

The range pulses are passed through an AND gate 42 when the output of the window flip-flop 36 is a logic one and are used to enable a range gate 45 to gate clock pulses from the clock circuit 39 to the range counter 26. In the illustrated system 1, the clock circuit 39 generates a one megahertz pulse rate clock signal. The range gate 45 is a combination of logic gates which function as a "glitch free" gate, the purpose of which is to allow only whole clock pulses to pass therethrough. This assures that an integral number of clock pulses are passed, thereby preventing spurious counts which might otherwise occur at the beginning, during, or end of the window period if the window flip-flop 36 or XOR gate 14 changes state in the middle of a clock pulse. The range counter 26 is read by the controller 17 at the end of the window period. Since two range pulses per doppler cycle are passed through the AND gate 42, the range count at the end of the window period is approximately double what it should be for a given phase difference between the A and B doppler signals. The controller 17 compensates for this by effectively dividing the total range count for the window period by two. The target range is determined by the controller 17 from the range count and window count at the end of the window period and is displayed on a range display 46 of the display devices 18 if all display criteria are met.

In the speed circuitry 15, the frequency of the A doppler signal is measured by counting the cycles thereof during the window period. The controller 17 senses the rising edge of each A doppler pulse on an input edge line (IEDG) 47 which carries the squared A doppler signal. During the window period, clock pulses from the clock circuit 39 are gated to the window counter 28 by a window gate 48, and the pulses of the A doppler signal are gated to the doppler counter 27 by a doppler gate 49. The window gate 48 and doppler gate 49 are both glitch free gates like the range gate 45 such that only whole pulses are passed respectively therethrough. The target speed is calculated from a combination of the window count of the window counter 28 and the doppler count of the doppler counter 27 at the end of the window period when one of the counters 28 or 27 counts out. The particular countout quantities for which the counter 27 and 28 are set depend on a number of factors including the frequency or pulse rate of the clock circuit 39, the clock speed of the controller 17, the speed of the software of the controller 17, the display update period, the effect of noise, the accuracy required of the speed and range determinations, and other factors. In the illustrated system 1, the window counter 28 counts out at 48750 (equivalent to 48.75 milliseconds), and the doppler counter 27 counts out at a count of 99. When the window period ends, the controller 17 is informed by way of an appropriate logic level on the terminal 38. When this occurs, the controller 17 reads the counters 28 and 27 and calculates the target speed and displays it on a speed display 51 of the displays 18 if all display criteria are met.

The direction circuitry 16 generally consists of a direction flip-flop 52 and the direction counter 29 which is an up/down counter. The A doppler signal is applied to a clock input 54 of the flip-flop 52, and the B doppler signal is applied to a data input 55 of the direction flip-flop. An output 56 of the flip-flop 52 is connected to an up/down control terminal 57 of the direction counter 29. A clock input 58 of the direction counter 29 receives the same glitch free gated A doppler signal which goes to the doppler counter 27. The direction flip-flop 52 has characteristics such that the logic level present on the data input 55 is transferred to the output 56 only in response to the occurrence of rising edges on the clock input 54. Thus, if the A doppler signal leads the B doppler signal in phase, the output signal transferred to the up/down control 57 is a logic zero. Conversely, if the B doppler signal leads the A doppler signal in phase, the up/down control signal is a logic one. In the system described, the A doppler signal is used as a reference in the system 1; thus the A doppler signal will lead in phase if the target is moving toward the antenna 20. If the target is moving away from the antenna 20, the B doppler signal will lead in phase. However, which signal leads depends on the system design.

At the beginning of each window period, the direction count is reset to a zero count by the reset signal on the reset line 31. Thereafter, the up/down control is set by the sense of the phase between the A and B doppler signals. Throughout the window period, the direction counter 29 counts the pulses of the A doppler signal, either in an increasing direction from zero or decreasing from zero. At the end of the window period, the direction counter is read by the controller 17, and the direction of count can be determined by checking the sign bit of the direction count. The relative target direction is displayed on a target direction indicator 59 of the displays 18 if all display criteria are met and may be, for example, a plus sign for approaching targets and a minus sign for targets moving away.

The system 1 includes target direction and range select switches 60 which allow the operator to select the classes of targets to be monitored by the system 1. In their simplest form, the select switches 60 cause the system 1 to monitor only targets moving away from, only targets moving toward, or traffic in both directions with respect to the system 1. Additionally, the select switches 60 may be used to select a specific distance at which the system 1 will begin to report the speeds of targets. The selected distance may be in the form of a minimum distance, a maximum distance, or both to monitor within selected target range limits. Further, the switches 60 may be set to alert the operator, for example audibly, when a target is at one or more selected ranges. The select switches 60 are connected to an input port of the controller 17 and may be read periodically to determine if the pattern of switch settings has changed or may be arranged to interrupt the controller 17 when a change in the manner of target acquisition has been selected. If a change has occurred, the controller 17 jumps to an appropriate routine in the control program to perform the function indicated by the particular pattern of switch settings. When the select switches 60 are set to monitor traffic moving in a certain direction, the controller 17 inhibits the display of target motion parameters when the determined target direction is contrary to the selected direction. Similarly, when a set of target range limits is selected, the controller 17 inhibits the display of information associated with targets whose ranges fall outside of the selected target range limits. Thus, the system 1 allows the range at which traffic is monitored to be varied without adjustment of the receiver sensitivity which is left at a factory adjusted optimum setting.

The radar system 1 is provided with an audio signal output to increase the information available to the operator. In the system 1, the A doppler signal is divided by four by a divider circuit 61 to give a more audible signal, power amplified by an amplifier 62, and converted to a sound signal by a speaker 63. Preferably, a volume control 64 is also included between the divider 61 and the amplifier 62. When no target is present, the divider 61 can be held in a reset state by an audio squelch signal applied to a reset input 65 by the controller 17 to avoid operator annoyance. The audio squelch signal can be eliminated by use of a squelch control 66. The audio signal alerts the operator to the presence of monitorable targets and to changes in speed of targets. There are times when it is desirable to freeze or lock the displays 18, for example, to save a reading while a speed violator is pursued. For this purpose, a lock display switch 67 is provided which when operated interrupts the controller 17 and maintains the current readings. In order to confirm that the lock display state has been entered, a beep oscillator 68 is provided. The oscillator 68 is amplified by the amplifier 62 and overrides the normal audio signal through the speaker 63. The lock display state may be exited by operating the switch 67 again and the normal mode of operation re-entered.

The controller 17 may be any combination of a microprocessor and interface adapter circuits which can process the required data in the required time. Microprocessors having an eight bit data width and a one megahertz master clock speed are known to be adequate for the purposes of the controller 17 in the system 1. A preferred device for the controller 17 is of the Motorola 6801 family of microcomputers on a single chip, such as the 68701 processor. When one of these processors is employed, a number of the functions of the logic section 3 can be incorporated internally within the controller 17 and in the software executed thereby including: the counters 27, 28, and 29; the clock circuit 39, the window and doppler glitchfree gates 48 and 49, the NOR gate 34, and the beep oscillator 68. These circuit blocks are enclosed within a broken line 70 in FIG. 2.

The 6801 processor includes a programmable timer, programmable input/output ports, read-only memory, read/write memory along with a microprocessor section within a single integrated circuit package. Further details of the 6801 family of processors are available in the "Motorola MC6801 8-bit single-chip Microcomputer Reference Manual" [Motorola part number MC6801RM(AD2)] or the 6801 section of the Motorola MICROPROCESSORS Data Manual which is incorporated herein by reference. The controller 17 executes a program stored therein or in other memory circuits: to control the circuitry within the front end portion 2 and the logic section 3; to calculate the target range, speed, and relative direction from the data provided by the front end 2 and logic section 3; and to assess the reliability of the calculated parameters and to decide which, if any, parameters are reliable enough to display.

The control program initiates the window period by causing the data input 35 of the window flip-flop 36 to go to logic one. The counters 26, 27, 28 and 29 are all reset just prior to the starting of the window. The next rising edge of the A doppler signal starts the window period by causing the output 38 of the window flip-flop 36 to go to logic one, thereby directly enabling the window gate 48 and the doppler gate 49 and indirectly enabling the range gate 45 in cooperation with the AND gate 42. On each succeeding doppler edge, the doppler counter 27 is incremented and the direction counter 29 is incremented or decremented depending on the logic level present at the up/down control terminal 57 thereof. On the second doppler edge of a window period, the window counter 28 is read and the current window count is designated the Period number of the A doppler signal. On the third and all succeeding doppler edges, the current window count is read and has the previous window count subtracted therefrom to derive the current period. The current period is compared to the Period number, and the absolute difference therebetween is accumulated as a signal quality number. The signal quality number relates to the consistency of period of the A doppler signal over the window period.

When either the window count reaches 48750 or the doppler count reaches 99, a countout signal is passed from the associated countout terminal 32 or 33 through the NOR gate 34 to the data input 35 of the window flip-flop 36. On the next doppler edge, the output 38 of the window flip-flop 36 goes to a logic zero which causes data taking for the current window to cease by disabling the window and doppler gates 48 and 49 and the AND gate 42. The current counts in the counters 26, 27, 28 and 29 are read and stored by the controller 17 for further processing.

The target speed and range are calculated using formulas derived from known relationships between the frequency of operation, the speed of the target (and the transceiver 4, if moving), the phase relationships of the A and B doppler signals, the target range, and certain known constants. In calculating the speed and range, intermediate parameters may be employed for convenience instead of the actual counts, such as angular degrees for range calculations. The target speed is measured and calculated in terms of a "unit doppler period" which is the reciprocal of a "unit doppler frequency". The unit doppler frequency is the doppler shift in the original transmitted frequency for a unit of speed in the desired dimensions of speed, such as hertz per miles per hour. In the system 1, the target speed is equal to the unit doppler period multiplied by the ratio of the doppler count to the window count.

The determination of the target range is complicated by the fact that in the system 1, there is only a 180 degree range of phase uniqueness possible between the A and B doppler signals for a given transmitted frequency difference since the transmitted signals are quasi-continuous and because the range pulses derived in the range circuitry 14 are proportional to the absolute phase differences. Thus, as the range increases beyond a "180 degree distance", the indicated range starts to decrease and the indicated direction of motion is opposite the true direction up to the 360 degree distance. Another problem is noise. Noise makes the distance reading vary somewhat for mid-range distances, but distorts the distance and direction readings near the zero and 180 degree distances. Over the typical window time, the phase variations due to noise tend to cancel out. While near the zero and 180 degree distances, the phase variations tend to add rather than cancel.

One solution to this problem is to use two or more distinct 180 degree distance settings. The longest distance is greater than the greatest range at which the radar system can reasonably read a target. As the target approaches, successively shorter distances are selected by successively increasing the frequency difference between the two transmit frequencies such that the phase difference between the A and B doppler signals approaches ninety degrees. At this point, the frequency difference of the transmitter signal is varied, either wider or narrower depending respectively on whether the target is approaching or moving away, to maintain the phase angle in a fairly narrow range about ninety degrees to thus maintain an optimum phase to noise relationship. In the system 1, such a method is employed starting with a coarse distance and switching to a fine distance if or when the target is sensed to be within the range of the fine distance setting. This is determined and controlled automatically by the controller 17 by way of the range control 24 of the front end 2 of the system 1. The distance settings are changed between windows to maintain the validity of data for a given window. In the system 1, the 180 degree distance is the first distance at which the A and B doppler signals differ by 180 degrees and is equal to one-fourth the wavelength of the frequency difference between the two transmit frequencies. The target range at the end of a given window is equal to the 180 degree distance multiplied by the ratio of the range count to the window count.

In the system 1, the reliabilities of the calculated target speed, range, and direction are assessed before such readings are displayed. In addition, each parameter which is displayed is automatically held for a selected length of time to improve readability to avoid a flickering and fluctuating display. The quality assessment for the target speed requires that the signal quality number, described above, be less than one-sixteenth of the associated window count. The quality assessment for target range requires: that the target speed be of acceptable quality; that the target speed differ by less than two speed units (e.g. miles per hour) from the speed already displayed (if any) or be equal to the last window's speed if no speed is displayed; that the target range measured in the current window and last window differ by less than two degrees of phase; and that the target direction sensed in the current window and in the last window be the same. If only the target speed is of acceptable quality, and the currently displayed speed is sufficiently old, the range display 46 is blanked and only the speed is displayed. When the currently displayed data becomes sufficiently old, the displays are blanked, provided there is no new data.

If the target range is displayable, the target speed is also calculated and displayed from the same data set. These simultaneous criteria are used to force the target range and speed information to be calculated from data related to the same target, thereby preventing speed information from one target from being displayed along with range information from another target or range information from a point between targets.

FIGS. 3, 5, and 6 illustrate a modified embodiment of the doppler radar system according to the present invention. The moving radar system 71 (FIG. 5) is capable of measuring the speed, range, and direction of a moving target with the radar system positioned in a moving platform vehicle. The moving radar system 71 accomplishes this generally by transmitting a microwave signal which is reflected by the target and by the roadway on which the platform vehicle and target are travelling. Signal components reflected by the target and the roadway are isolated; and the target signal components are processed to determine the speed, range, and direction of the target relative to the platform while the platform signal components are processed to determine the speed and direction of the platform relative to the roadway. The relative target speed and the platform speed are then mathematically combined in a manner prescribed by the direction information and the antenna in use, if more than one antenna is available, to determine the target speed relative to the roadway which is the main parameter of interest.

Referring to FIG. 5, the moving radar system 71 includes a front end or analog portion 72 and a logic or digital portion 73. The front end 72 is substantially similar to the front end 2 of the system 1 except for the type and number of filters which are required to separate the roadway reflected components of the return signal from the target reflected components. The front end 72 includes a dual frequency radio frequency transmitter to propagate the signal, a receiver to receive the return signal and down convert same to a multiplexed doppler signal, and a preamplifier and automatic gain control section--none of which is illustrated.

Referring to FIG. 3, the multiplexed doppler signal is processed by a demultiplexer or demux circuit 75 to separate same into complex A and B analog doppler signals related respectively to A and B frequencies between which the transmitter is shifted. Each of the A and B complex doppler signals, which are present at the demux A and B outputs 76 and 77 respectively, includes roadway reflected components and target reflected components. The demultiplexer circuit 75 separates the A and B complex signals using a slightly delayed replica of the frequency shift signal which is used to frequency shift the transmitter in the same manner as the demux circuit 6 of the system 1.

In general, the analog doppler signals are filtered to separate the platform doppler signals and the target doppler signals therefrom and which are then squared for digital processing in the logic portion 73. The platform filter circuits 79 are A and B tunable bandpass filters which are caused to tune to the doppler frequencies of the roadway reflected signal components containing information about the motion of the platform vehicle. The roadway reflected signal components are reflections of the transmitted signal from the road surface and objects and structures therealong such as signs, utility poles, terrain details, and the like. The platform filters 79 eliminate the effect of traffic moving in the same direction as the platform on the low frequency end of the pass band and the effect of oncoming traffic on the high frequency end of the pass band. The tunable feature of the filters 79 causes tracking of variations in the frequency of the platform signals thereby allowing the platform to travel at virtually any convenient speed. The output signals from the platform filters 79 are A and B analog doppler signals which are passed through platform A and B squaring circuits 80 which provide A and B platform digital signals designated PA and PB in FIGS. 3 and 5.

Regarding the target reflected signals, there are two main classes of target situations which are of interest in same-lane moving radar systems: targets which are moving in the same direction as the platform or "same-lane" targets and those which are moving in the opposite direction or "oncoming" targets. With same-lane targets, the relative speed of the target with respect to the platform is usually less than the speed of the platform. Therefore, the doppler frequency of a signal reflected from a same-lane target is less than the doppler frequency of the roadway reflected signal, and low pass filters are required to separate these components from the complex doppler signals. Conversely, the relative speeds of oncoming targets are always greater than the speed of the platform, and high pass filters are required to separate these doppler components.

The system 71 includes A and B tunable low pass filters 82 for same-lane targets and A and B tunable high pass filters 83 for oncoming targets. The outputs of the same-lane filters 82 are passed through A and B same-lane squaring circuits 84 while the outputs of the oncoming filters 83 are passed through A and B squaring circuits 85. The oncoming channel includes A and B low pass filters 86 to remove components of the frequency shifting signal from the oncoming doppler signals. The filters 86 may have a fixed frequency response. Such filters are not required in the same-lane and platform channels since each of these already have or incorporate low pass filters therein. The members of each set of A and B filters 79, 82, 83, and 86 are required to be matched in phase delay characteristics or compensated for to preserve the original phase relationship between the A and B signals in each channel.

The system 71 includes circuitry for selecting the type of targets to be monitored. Such selection is made through a system controller or microprocessor 90 (FIG. 5) by way of a mode select A circuit 91 and a mode select B circuit 92 (FIG. 3) which are connected among the outputs of the target squaring circuits 84 and 85. Each mode selector 84 or 85 may be a two line-to-one line data selector type of device having two inputs, a single output, and a control terminal. The A members of the squarers 84 and 85 are connected to the A selector 91 while the B members of the squarers 84 and 85 are connected to the B selector 92. The selectors 91 and 92 receive from the controller 90 a mode select control signal of one logic level to select same-lane targets and of a complementary logic level to select oncoming targets. The mode selection process originates with a mode select switch 93 which is connected to and monitored by the controller 90 (FIG. 5).

FIG. 4 illustrates the composite frequency response of the filter sets 79, 82, 83, and 86. The left hand curve 95 is the frequency response of the target same-lane filters 82 wherein the left corner 96 is caused by capacitor coupling and is below any doppler frequency of interest and the right corner 97 is the break point of the low pass same-lane filters 82. The middle curve 98 is the response of the platform bandpass filters 79. The right hand curve 99 relates to oncoming targets wherein the left corner 100 is the break point of the high pass oncoming filters 83 while the right corner 101 is the break point of the fixed low pass filters 86 in the oncoming target channel.

Referring to FIG. 5, the outputs of the selectors 91 and 92, labelled TA and TB for A target doppler and B target doppler signals, are processed by target parameter circuitry 104 to determine the range, relative speed, and direction of the target. The target parameter circuitry 104 is substantially similar in components and operation to the range, speed, and direction circuits 14, 15, and 16 of the system 1 and provides a range count, doppler count, window count, and a direction count to the controller 90. In FIG. 5, the window count is incorporated with the doppler count as "speed counts" for graphic convenience although the window count is also used in determining the target range. Substantially the same quality assessments are made on the target parameters in the moving radar system 71 as in the stationary system 1.

The platform motion parameters are derived from the platform doppler signals PA and PB by platform speed circuitry 106 and platform direction circuitry 107. The platform speed circuitry 106 includes a window flip-flop 109, a window gate 110, a window counter 111, a doppler gate 112, and a doppler counter 113. The platform direction circuitry 107 includes a direction filp-flop 114 and a direction counter 115. The platform speed circuitry 106 and direction circuitry 107, operate in a similar fashion respectively to the speed circuitry 15 and direction circuitry 16 of the system 1.

The platform parameters are derived over a variable platform window or calculation period which is coordinated with a variable target window period by means of a reset signal from the controller 90 on a reset line 117 at the beginning of the window periods and by a window termination signal from a NOR gate 118 at the end of the window periods. After the reset signal, the target window begins with the first rising edge of the A target doppler signal TA while the platform window begins with the first rising edge of the A platform doppler signal PA. The end of the window periods is initiated when the first of a target window counter or doppler counter (not shown) or the platform window counter 111 or doppler counter 113 counts out. The target window ends with the first rising edge of the A target doppler signal TA while the platform window ends with the first rising edge of the A platform doppler signal PA, both first rising edges being the first following the counting out as signaled by the output of the NOR gate 118. While the target and platform windows are enabled and disabled simultaneously (by the output of NOR 118) and their periods mostly overlap, they are each begun and ended by their respective A channel doppler signal. Thus each window is caused to be an integer number of doppler cycles of the target and platform A channel doppler signal respectively.

During an active platform window period, the platform window counter 111 counts clock pulses from a clock circuit 119 as gated by the glitch free platform window gate 110 while the platform doppler counter 113 counts the pulses of one of the platform dopler signals (illustrated as the PA doppler signal) as gated by the glitch free platform doppler gate 112. In the platform direction circuitry 107, the phase lead/lag relationship of the A and B platform doppler signals is determined by the cooperation of the platform direction flip-flop 114 and the up/down platform direction counter 115. At the end of the platform window period, the counts from the counters 111, 113, and 115 are read by the controller 90 for processing to determine the speed and direction of the platform vehicle.

The platform speed and direction are determined from the platform window, doppler, and direction counts using the same formulas and similar quality assessments used for the corresponding target parameters in the system 1. When the platform speed has been determined, it is mathematically combined with the relative target speed to determine the absolute speed of the target with respect to the roadway. The manner of combining the platform and target speeds is determined by the relative direction of motion between the target and the platform. Strictly speaking, the direction of movement of the platform does not need to be measured if the radar signal is always transmitted in a single direction, such as in the forward direction of the platform vehicle and there are no interfering signals caused by other vehicles. However, it is practicable to mount the antenna of the system 71 in either a forward or rear direction or to employ two antennas as will be described below. The platform direction circuitry 107 is provided for these possibilities of uses.

In order to properly combine the platform and target speeds, an algebraic sign convention is adopted wherein the speeds are considered either positive or negative according to the mode selected and the relative directions of the vehicles. If such signs are properly and consistently assigned and the vehicle directions correctly measured, then the mathematical operation is always a matter of addition, and the numerical result is the true speed of the target while the sign of the target speed indicates the relative direction of the target with respect to the platform. With this and the target range, the target whose speed has been measured can be much more confidently identified.

While the relative directions of the platform and target can be detected from the respective direction counts, it is sometimes desirable to monitor only certain classes of targets or target situations. For example, it might be desirable to monitor forwardly opening same-lane targets from a patrol car travelling at the speed limit or same-lane targets closing from the rear. Also it might be desirable to only monitor same-lane or oncoming targets within a certain range of the platform. For these situations, the system 71 is provided with target direction and range select switches 121 which are connected to and monitored by the controller 90.

The system 71 includes numeric display devices connected to the controller 90 and including a target range display 123, a target speed display 124, and a platform speed display 125 for displaying these parameters in selected dimensional units such as feet for range and miles per hour for speeds. A target direction indicator 126 which is capable of indicating direction is connected to the controller 90. In order to freeze or lock the displays, a lock display switch 127 is provided. An audible indication of the locking of the displays is provided through audio circuitry 128 similar to that in the system 1 and a speaker 129. The audio circuitry 128 also receives one of the target doppler signals, such as the TA signal, which is divided thereby to give an audible indication of the relative speed of the target.

FIGS. 3 and 5 diagrammatically illustrate only components for monitoring targets while the platform is in motion. However, a practical moving traffic radar unit would desirably include provisions for monitoring targets from a stationary platform as well. For this mode, filters such as the filters 7 and 9 of the system 1 would be included and would be connected to the A and B analog doppler outputs 76 and 77 of the demultiplexer circuit 75. Additionally, selection switches connected to the controller 90 would be needed. Alternatively, the fixed low pass filters 86 of the oncoming channel (FIG. 3) could be employed with switching circuits for bypassing the oncoming filters 83 or 82 tuned high enough.

FIG. 6 illustrates a dual antenna radar system 135 according to the present invention. The system 135 includes a front facing antenna 136 and a rear facing antenna 137. Because of the complexities of microwave devices in general and because of the relationship of the transmitters and receivers of the embodiments of the present invention, it is most practical to duplicate not only the antennas but also the transceivers. Therefore, a front channel 138 includes the front antenna 136, a front transceiver 139, a front amplifier section 140 and a front transmitter range control circuit 141. Similarly, a rear channel 143 includes a rear transceiver 144, a rear amplifier section 145, and a rear transmitter range control circuit 146. The amplifiers sections 140 and 146 are connected to an antenna select switching circuit 148 which may be a two line-to-one line analog multiplexer or similar circuitry for selecting the desired antenna. The antenna select circuit 148 is controlled by the logic level of an antenna select signal from a controller or microprocessor 149 as toggled by a front/rear antenna switch 150 connected to the controller 149. An indication of which antenna has been selected is displayed by a front/rear antenna indicator 151 connected to the controller 149.

The components of the front and rear channels 138 and 143 are mutually identical and are the same as corresponding components of the front end 2 of the system 1 as are the remaining componnets of the system 135. While the dual antenna system 135 is primarily intended for use in a moving radar system such as the system 71, it may also be applied to a stationary only radar system such as the system 1. In a moving system, the front and rear antennas increase the flexibility of target selection and the utility of the system 135.

If the measurement of the platform speed is complicated by the presence in one direction of certain structures such as bridge abutments which might cause errors, the opposite antenna can be selected. The controller 149 can switch between the two antennas 136 and 137 and compare the speeds measured in each direction to assure that they are the same.

The controller 149 can also switch between the two antennas to check the platform direction determined from each antenna to determine proper correspondence. There are traffic situations in which an entirely erroneous platform direction might be reported. For example, if a patrol car were close behind a large truck, the majority of reflected signal power would likely be from the truck. If the truck were pulling away from the patrol car, the reported platform direction would imply that the patrol car was traveling in reverse. With proper data tests in the software of the controller of the system 135, such an erroneous platform direction would cause a switch to the rear antenna 137 to determine the platform speed. After this, the controller 149 would switch back to the front antenna 136 and use the just calculated platform speed to steer the platform doppler filters (such as the filters 79 in FIG. 3) to the correct doppler frequency to find the roadway reflected components for combination with the relatie target speed to determine the speed of the truck. For such functioning, the platform doppler filters 79 would have to be steerable response filters with steering control provided by the associated controller, as indicated by the broken line arrow at the filters 79 in FIG. 3.

The availability of the front and rear antennas 136 and 137 and associated transceiver channel circuitry 138 and 143 along with the ability to switch therebetween makes it possible to operate the system 135 in a fairly comprehensive automatic monitoring mode with suitable software and the addition of just a few selection switches (not shown). In such an automatic monitoring mode, the operator would set the maximum legal speed or target violation speed either by use of a numeric keypad (not shown) or by traveling at such speed and operating an "enter speed" switch (not shown) after entering the automatic mode or using the range control switch 121 (FIG. 5) in combination with an enter speed switch (not shown). After this, the system would alternately switch between monitoring same-lane and opposite lane targets to the front and rear, alloting a single window or several windows to each class of targets, generate an alert signal when a speed in excess of the set speed had been sensed, and display the set violation speed, the measured target speed, direction, and range, the corresponding platform speed, the current lane monitored, and the antenna in use. With this information, the officer would have a good idea of where to look for the violator. Upon observing the most likely violator, the officer could exit the automatic mode to a more restricted monitoring direction and take additional readings to either confirm or dispell his suspicions. The alert signal generated may be either in the form of an audible alarm or in the form of a control signal to cause, for example, the operation of a camera to photograph the license plate of the violator, depending upon the requirements of the local traffic laws.

Since each window period in the embodiments of the present invention is less than one-twentieth of a second, many readings per second can be made, even allowing for calculation times. Thus, such an automatic monitoring mode could greatly increase the vehicle speed monitoring capability of a traffic officer, even in a changing multiple target environment. There is a possibility with enhanced capabilities of such an automatic monitoring system that the ability of a one megahertz eight bit microprocessor, as referred to above, to process the required data in real time might be taxed. However, faster devices having greater throughput are commercially available and could readily be adapted to the doppler radar systems of the present invention.

It is to be understood that while certain forms of the present invention have been illustrated and described herein, it is not to be limited to the specific forms or arrangement of parts described and shown.

What is claimed and desired to be secured by letters patent is as follows:

1. A method of remotely determining a parameter of motion of a moving target comprising the steps of:
   (a) transmitting a radio frequency signal toward a moving target;
   (b) receiving a target reflected signal which is said radio frequency signal as reflected from said target;
   (c) processing said target reflected signal to derive a doppler signal including doppler pulses;
   (d) establishing a variable window period extending between the beginning of one of said doppler pulses and the beginning of another of said doppler pulses; and
   (e) processing said doppler signal over said variable window period to derive a parameter of motion of said target.

2. A method of remotely determining the speed, range, and relative direction of movement of a moving target comprising the steps of:
   (a) transmitting a radio frequency siganl toward a moving target;
   (b) receiving a target reflected signal which is said radio frequency signal as reflected from said target;
   (c) processing said target reflected signal to derive a target range;
   (d) processing said target reflected signal to derive a target speed;
   (e) processing said target reflected signal to derive a relative target direction;
   (f) displaying said target range and said target speed in selected dimensional units;
   (g) displaying an indication of said relative target direction;
   (h) periodically alternating the frequency of said radio frequency signal between a first frequency and a second frequency;
   (i) converting a first component of said target reflected signal which is related to said first frequency to a first doppler signal;
   (j) converting a second component of said target reflected signal which is related to said second frequency to a second doppler signal;
   (k) measuring the phase angle of the phase difference between said first and second doppler signals;
   (l) scaling said phase angle to said target range;
   (m) alternating the frequency of said radio frequency signal between said first and second frequencies if said target range is greater than a selected range; and
   (n) alternating the frequency of said radio frequency signal between a third frequency and a fourth frequency if said target range is not greater than said selected range.

3. A method of remotely determining the speed, range, and relative direction of a moving target comprising the steps of:
   (a) transmitting a radio frequency signal which periodically alternates between a first frequency and a second frequency toward a moving target;
   (b) receiving target reflected signals related respectively to said first and second frequencies;
   (c) converting a target reflected signal related to said first frequency to a first doppler signal and a target reflected signal related to said second frequency to a second doppler signal;
   (d) measuring the phase angle of the phase difference between said first and second doppler signals and scaling said phase angle to a target range by:
      (i) digitally combining said doppler signals to isolate a range pulse having a pulse width proportional to said phase angle;
      (ii) generating clock pulses;
      (iii) gating said clock pulse to a range counter circuit with said range pulse such that the number of said clock pulses gated is proportional to said phase angle;
      (iv) counting said clock pulses with said range counter circuit resulting in a range count;
      (v) scaling said range count to said target range in selected dimensional units;
   (e) measuring the doppler frequency of one of said doppler signals and scaling said doppler frequency to a target speed;
   (f) detecting the phase lead/lag relationship between said doppler signals and converting said phase relationship to a relative target direction; and
   (g) displaying said target range and said target speed.

4. A method as set forth in claim 3 including the step of:
   (a) displaying an indication of said relative target direction.

5. A method as set forth in claim 3 including the steps of:
   (a) selecting a set of target range limits; and
   (b) displaying said target range only upon said target range falling within the selected set of target range limits.

6. A method as set forth in claim 3 including the steps of:
   (a) deriving a plurality of said range counts;
   (b) scaling each range count to an intermediate range parameter;
   (c) comparing each current intermediate range parameter with the previous intermediate range parameter; and
   (d) scaling said current range count to a current target range and displaying said current target range only if said current intermediate range parameter differs from said previous intermediate range parameter by less than a selected amount.

7. A method as set forth in claim 3 including the steps of:
   (a) deriving a plurality of said relative target directions;
   (b) comparing each current target direction with the previous target direction; and
   (c) scaling said current range count to a current target range and displaying said current target range only if said current target direction is same as said previous target direction.

8. A method as set forth in claim 3 including the steps of:
   (a) counting the pulses of said one of said doppler signals over a measured period of time resulting in a doppler count; and
   (b) scaling said doppler count over said measured period to a target speed in selected dimensional units.

9. A method as set forth in claim 3 including the steps of:
   (a) selecting a set of target range limits; and
   (b) displaying said target speed only upon the corresponding target range falling within the selected set of target range limits.

10. A method of remotely determining the speed, range, and relative direction of a moving target comprising the steps of:
    (a) transmitting a radio frequency signal which periodically alternates between a first frequency and a second frequency toward a moving target;
    (b) receiving target reflected signals related respectively to said first and second frequencies;
    (c) converting a target reflected signal related to said first frequency to a first doppler signal and a target reflected signal related to said second frequency to a second doppler signal;
    (d) measuring the phase angle of the phase difference between said first and second doppler signals and scaling said phase angle to a target range;
    (e) measuring the doppler frequency of one of said doppler signals and scaling said doppler frequency to a target speed by:
       (i) generating clock pulses;
       (ii) activating at the beginning of a doppler cycle a window counter which counts said clock pulses when activated to derive a window count;
       (iii) activating a doppler counter which counts the pulses of said one of said doppler signals when activated to derive a doppler count;
       (iv) enabling the deactivation of said window counter and said doppler counter upon the first to occur of said window counter reaching a selected terminal window count or said doppler counter reaching a selected terminal doppler counter;
       (v) deactivating said window counter and said doppler counter at the beginning of the next doppler pulse of said one of said doppler signals after said enabling step;
       (vi) computing a target speed from a combination of the window count and the doppler count which are current when said window and doppler counters are deactivated.
    (f) detecting the phase lead/lag relationship between said doppler signals and converting said phase relationship to a relative target direction;
    (g) displaying said target range and said target speed.

11. A method as set forth in claim 10 including the steps of:
    (a) in response to the occurrence of each pulse of said one of said doppler signals while said window counter is activitated, reading said window counter and storing the current window count, the first such window count read being a first period count;
    (b) subtracting each current window count from the previous window count, resulting in a current period count;
    (c) differencing each current period count with said first period count, resulting in a respective period number;
    (d) summing the absolute value of the period numbers while said window counter is activated, resulting in a signal quality number; and
    (e) computing said target speed and displaying said target speed only if said signal quality number is less than a selected fraction of said window count when said window counter is deactivated.

12. A method as set forth in claim 11 including the step of:
    (a) scaling a phase angle to a target range and displaying said target range only if the current target speed is displayable.

13. A method of remotely determining the speed, range, and relative direction of a moving target comprising the steps of:
    (a) transmitting a radio frequency signal which periodically alternates between a first frequency and a second frequency toward a moving target;
    (b) receiving target reflected signals related respectively to said first and second frequencies;
    (c) converting a target reflected signal related to said first frequency to a first doppler signal and a target reflected signal related to said second frequency to a second doppler signal;
    (d) measuring the phase angle of the phase difference between said first and second doppler signals and scaling said phase angle to a target range;
    (e) alternating the frequency of said radio frequency signal between said first and second frequencies if said target range is greater than a selected range;
    (f) alternating the frequency of said radio frequency signal between a third frequency and a fourth frequency if said target range is not greater than said selected range;
    (g) measuring the doppler frequency of one of said doppler signals and scaling said doppler frequency to a target speed;
    (h) detecting the phase lead/lag relationship between said doppler signals and converting said phase relationship to a relative target direction; and
    (i) displaying said target range and said target speed.

14. A method of remotely determining the speed, range, and relative direction of a moving target comprising the steps of:
    (a) transmitting a radio frequency signal which periodically alternates between a first frequency and a second frequency toward a moving target;
    (b) receiving target reflected signals related respectively to said first and second frequencies;
    (c) converting a target reflected signal related to said first frequency to a first doppler signal and a target reflected signal related to said second frequency to a second doppler signal;
    (d) said first and second frequencies comprising a narrowest frequency pair and causing a selected range of phase difference between said first and second doppler signals to correspond proportionally to a set of longest target ranges, and including the steps of:
       (i) determining a plurality of frequency pairs of successively wider frequency differences between said first and second frequencies which will cause said selected range of phase differences to correspond proportionally to a respective plurality of sets of successively shorter target ranges;
  (ii) beginning with said narrowest frequency pair, alternating the frequency of said radio frequency signal between successively wider frequency pairs and for each frequency pair measuring said phase angle and said target range until said phase angle enters said selected range of phase differences;
  (iii) determining if the measured target ranges are decreasing or increasing;
  (iv) upon said measuring target ranges decreasing, alternating between successively wider frequency pairs to maintain said phase angle within said selected range of phase differences;
  (v) upon said measured target ranges increasing, alternating between successively narrower frequency pairs to maintain said phase angle within said selected range of phase differences;
(e) using the difference between frequency pairs, and the phase difference between said first and second doppler signals and scaling to a target range;
(f) measuring the doppler frequency of one of said doppler signals and scaling said doppler frequency to a target speed;
(g) detecting the phase lead/lag relationship between said doppler signals and converting said phase relationship to a relative target direction; and
(h) displaying said target range and said target speed.

15. A method of remotely determining the speed, range, and relative direction of movement of a moving target comprising the steps of:
  (a) transmitting a radio frequency signal from a moving platform vehicle toward a moving target;
  (b) receiving a return signal on said platform vehicle, said return signal including a roadway reflected signal component which is said radio frequency signal as reflected from stationary objects along a roadway on which said platform vehicle is moving and a target reflected signal component which is said radio frequency signal as reflected from said target;
  (c) isolating a roadway reflected signal and a target reflected signal from said return signal;
  (d) processing said roadway reflected signal to derive:
    (1) a platform speed with respect to said roadway; and
    (2) a platform direction with respect to said roadway;
  (e) processing said target reflected signal to derive:
    (1) a target range with respect to said platform vehicle;
    (2) a relative target speed with respect to said platform vehicle; and
    (3) a target direction with respect to said platform vehicle;
  (f) mathematically combining said relative target speed and said platform speed in a manner determined by the relationship of said target direction and said platform direction to derive an absolute target speed with respect to said roadway;
  (g) displaying said platform speed, said absolute target speed, and said target range in selected dimensional units; and
  (h) displaying an indication of said target direction.

16. A method of remotely determining the speed, range, and relative direction of movement of a moving target comprising the steps of:
  (a) transmitting a radio frequency signal from a moving platform vehicle toward a moving target;
  (b) receiving a return signal on said platform vehicle, said return signal including a roadway reflected signal component which is said radio frequency signal as reflected from stationary objects along a roadway on which said platform vehicle is moving and a target reflected signal component which is said radio frequency signal as reflected from said target;
  (c) isolating a roadway reflected signal and a target reflected signal from said return signal by:
    (i) bandpass filtering said return signal to isolate said roadpass reflected signal from said return signal;
    (ii) low pass filtering said return signal to isolate a first target reflected signal related to a first class of targets from said return signal;
    (iii) high pass filtering said return signal to isolate a second target reflected signal related to a second class of targets from said return signal;
    (iv) electronically selecting one of said first and second target reflected signals:
  (d) processing said roadway reflected signal to derive:
    (1) a platform speed with respect to said roadway; and
    (2) a platform direction with respect to said roadway;
  (e) processing said target reflected signal to derive:
    (1) a target range with respect to said platform vehicle;
    (2) a relative target speed with respect to said platform vehicle; and
    (3) a target direction with respect to said platform vehicle;
  (f) mathematically combining said relative target speed and said platform speed in a manner determined by the relationship of said target direction and said platform direction to derive an absolute target speed with respect to said roadway;
  (g) displaying said platform speed, said absolute target speed, and said target range in selected dimensional units; and
  (h) displaying an indication of said target direction.

17. A method of remotely determining the speed, range, and relative direction of movement of a moving target comprising the steps of:
  (a) transmitting a radio frequency siganl from a moving platform vehicle toward a moving target;
  (b) receiving a return signal on said platform vehicle, said return signal including a roadway reflected signal component which is said radio frequency signal as reflected from stationary objects along a roadway on which said platform vehicle is moving and a target reflected signal component which is said radio frequency signal as reflected from said target;
  (c) periodically alternating the frequency of said radio frequency signal between a first frequency and a second frequency;
  (d) isolating a roadway reflected signal and a target reflected signal from said return signal;
  (e) processing said roadway reflected signal to derive a platform speed with respect to said roadway by:

(1) converting a first component of said roadway reflected signal which is related to said first frequency to a first platform doppler signal;
(2) converting a second component of said roadway reflected signal which is related to said second frequency to a second platform doppler signal;
(3) measuring a platform doppler frequency of one of said platform doppler signals; and
(4) scaling said platform doppler frequency to a platform speed;
(f) processing said roadway reflected signal to derive a platform direction with respect to said roadway;
(g) processing said target reflected signal to derive:
(1) a target range with respect to said platform vehicle;
(2) a relative target speed with respect to said platform vehicle; and
(3) a target direction with respect to said platform vehicle;
(h) mathematically combining said relative target speed and said platform speed in a manner determined by the relationship of said target direction and said platform direction to derive an absolute target speed with respect to said roadway;
(i) displaying said platform speed, said absolute target speed, and said target range in selected dimensional units; and
(j) displaying an indication of said target direction.

18. A method as set forth in claim 17 wherein said platform direction is derived by:
(a) detecting the phase lead/lag relationship between said platform doppler signals; and
(b) converting said phase relationship to a platform direction.

19. A method of remotely determining the speed, range, and relative direction of movement of moving target comprising the steps of:
(a) transmitting a radio frequency signal from a moving platform vehicle toward a moving target;
(b) receiving a return signal on said platform vehicle, said return signal including a roadway reflected signal component which is said radio frequency signal as reflected from stationary objects along a roadway on which said platform vehicle is moving and a target reflected signal component which is said radio frequency signal as reflected from said target;
(c) isolating a roadway reflected signal and a target reflected signal from said return signal;
(d) processing said roadway reflected signal to derive a platform speed with respect to said roadway and a platform direction with respect to said roadway by:
(1) transmitting said radio frequency signal in a forward direction of said platform vehicle;
(2) processing said roadway reflected signal to derive a forward platform speed;
(3) transmitting said radio frequency signal in a rear direction of said platform vehicle;
(4) processing said roadway reflected signal to derive a rear platform speed;
(5) mathematically comparing said forward platform speed with said rear platform speed; and
(6) delaying the combining of one of said platform speeds with said relative target speed until said forward platform speed and said rear platform speed differ by less than a selected platform speed differential;
(e) processing said target signal to derive:
(1) a target range with respect to said platform vehicle;
(2) a relative target speed with respect to said platform vehicle; and
(3) a target direction with respect to said platform vehicle;
(f) mathematically combining said relative target speed and said platform speed in a manner determined by the relationship of said target direction and said platform direction to derive an absolute target speed with respect to said roadway;
(g) displaying said platform speed, said absolute target speed, and said target range in selected dimensional units; and
(h) displaying an indication of said target direction.

20. A method of remotely monitoring moving targets from a moving platform vehicle in a forward and rear direction and in a same direction lane and in an opposite direction lane as said platform vehicle and determining the speed, range, and relative direction of movement of said moving targets comprising the steps of;
(a) selecting a target violation speed;
(b) sequentially transmitting a radio frequency signal in each of a forward direction and a rear direction of signal transmission from a moving platform vehicle;
(c) receiving a return signal on said platform vehicle, said return signal including a roadway reflected signal component which is said radio frequency signal as reflected from stationary objects along a roadway on which said platform vehicle is moving and, if a moving target is present, a target reflected signal component which is said radio frequency signal as reflected from said target;
(d) for each of said forward and rear directions, sequentially processing said return signal to isolate, if present, a target reflected signal from a first class of target in a same direction lane as said platform vehicle and a second class of target in an opposite direction lane as said platform vehicle;
(e) for each isolated target reflected signal, isolating a corresponding roadway reflected signal from said return signal;
(f) processing each target reflected signal to derive:
(1) a target range with respect to said platform vehicle;
(2) a relative target speed with respect to said platform vehicle; and
(3) a target direction of motion with respect to said platform vehicle;
(g) processing each corresponding roadway reflected signal to derive:
(1) a corresponding platform speed with respect to said roadway; and
(2) a corresponding platform direction of motion with respect to said roadway;
(h) mathematically combining each relative target speed and said corresponding platform speed in a manner determined by the relationship of said target direction of motion and said corresponding platform direction of motion to derive an absolute target speed with respect to said roadway;
(i) comparing each absolute target speed with said target violation speed; and (j) upon said absolute target speed exceeding said target violation speed:
  (1) displaying an indication of said direction of signal transmission, said target violation speed, said absolute target speed, said target range, an indication of said target direction of motion, an indication of the class of target, and said corresponding platform speed; and
  (2) generating an alert signal.

21. A method of remotely determining the speed, range, and relative direction of movement of a moving target comprising the steps of:
  (a) transmitting a radio frequency signal from a moving platform vehicle toward a moving target in one of a forward platform direction or a rear platform direction with respect to said platform vehicle;
  (b) receiving a return signal on said platform vehicle, said return signal being at least one of said radio frequency signal as reflected from stationary objects along a roadway on which said platform vehicle is moving or said radio frequency signal as reflected from said target;
  (c) processing said return signal to derive at least a platform direction parameter indicating the relative direction of motion of said platform vehicle with respect to said roadway;
  (d) upon said platform direction parameter indicating rearward motion of said platform vehicle and thereby indicating that said return signal was not reflected from said roadway:
    (1) transmitting said radio frequency signal in an opposite platform direction;
    (2) receiving an opposite return signal; and
    (3) processing said opposite return signal to derive at least an opposite platform doppler frequency;
  (e) transmitting said radio frequency signal in the original platform direction;
  (f) receiving a third return signal;
  (g) filtering said third return signal to isolate a true roadway reflected signal by steering steerable filter means to an appropriate frequency response using said opposite platform doppler frequency;
  (h) processing said true roadway reflected signal to derive:
    (1) a true platform speed with respect to said roadway; and
    (2) a non-reverse platform direction of motion parameter with respect to said roadway;
  (i) isolating a target reflected signal from said third return signal;
  (j) processing said target reflected signal to derive:
    (1) a target range with respect to said platform vehicle;
    (2) a relative target speed with respect to said platform vehicle; and
    (3) a target direction parameter with respect to said platform vehicle;
  (k) mathematically combining said relative target speed and said true platform speed in a manner determined by the relationship of said non-reverse platform direction parameter and said target direction parameter to derive an absolute target speed with respect to said roadway;
  (l) displaying said true platform speed, said absolute target speed, and said target range in selected dimensional units; and
  (m) displaying an indication of said target direction parameter.

22. An apparatus for remotely determining the speed, range, and relative direction of movement of a moving target comprising:
  (a) a radio frequency transceiver operative to transmit a substantially continuous radio frequency signal periodically shifted between a first frequency and a second frequency toward a moving target, to receive target reflected signals related to said first and second frequencies, and to convert said target reflected signals related to said first and second frequencies respectively to a first doppler signal and a second doppler signal;
  (b) phase angle means receiving said doppler signals and operative to measure the phase angle between said first and second doppler signals, said phase angle means including:
    (1) clock circuit means generating clock pulses;
    (2) range pulse isolation means receiving said first and second doppler signals and digitally combining same to isolate a range pulse having a pulse width proportional to said phase angle;
    (3) range gate means connected to said range pulse isolation means, receiving said range pulse, and using said range pulse to gate a number of said clock pulses proportional to said pulse width; and
    (4) range counter means connected between said range gate means and said controller means, said range counter means counting the gated clock pulses resulting in said phase magnitude count;
  (c) doppler frequency means receiving one of said doppler signals and operative to measure the doppler frequency of said one of said doppler signals;
  (d) target direction means receiving said doppler signals and operative to detect the phase lead/lag relationship between said first and second doppler signals;
  (e) controller means receiving signals representing said phase angle, said doppler frequency, and said phase relationship; said controller means scaling said phase angle to a target range and said doppler frequency to a target speed and converting said phase relationship to a relative target direction; and
  (f) display means connected to said controller means and displaying said target range and said target speed in selected dimensional units and indicating said relative target direction.

23. An apparatus for remotely determining the speed, range, and relative direction of movement of a moving target comprising:
  (a) a radio frequency transceiver operative to transmit a substantially continuous radio frequency signal periodically shifted between a first frequency and a second frequency toward a moving target, to receive target reflected signals related to said first and second frequencies, and to convert said target reflected signals related to said first and second frequencies respectively to a first doppler signal and a second doppler signal;
  (b) phase angle means receiving said doppler signals and operative to measure the phase angle between said first and second doppler signals;
  (c) doppler frequency means receiving one of said doppler signals and operative to measure the doppler frequency of said one of said doppler signals;
  (d) said doppler frequency including target speed means receiving said one of said doppler signals and generating a doppler counter which is the count of the pulses of said doppler signal over a measured period of time, said target speed being computed from said doppler count and the length of said period of time;

(e) clock circuit means generating clock pulses;

(f) window counter means operative to count said clock pulses to derive a window count to thereby measure said length of said period of time;

(g) window gate means connected between said clock circuit means and said window counter means, said window gate means being controllable to gate said clock pulses to said window counter means;

(h) doppler counter means operative to count the pulses of said one of said doppler signals to derive a doppler count;

(i) doppler gate means connected to said doppler counter means, said doppler gate means being controllable to gate said one of said doppler signals to said doppler counter means;

(j) window control means operatively connected to said controller means, said window gate means, and said doppler gate means, said window control means simultaneously controlling said window gate means and said doppler gate means to begin gating said respective pulses at the beginning of a doppler pulse, enabling said winow gate means and said doppler gate means to stop gating said respective pulses when either said window counter has reached a selected terminal window count or said doppler counter has reached a selected terminal dopper count, and controlling said window gate means and said doppler gate means to stop gating said respective pulses at the beginning of a doppler pulse; said controller means computing said target speed from said window count and said doppler count;

(k) target direction means receiving said doppler signals and operative to detect the phase lead/lag relationship between said first and second doppler signals;

(l) controller means receiving signals representing said phase angle, said doppler frequency, and said phase relationship; said controller means scaling said phase angle to a target range and said doppler frequency to a target speed and converting said phase relationship to a relative target direction; and (m) display means connected to said controller means and displaying said target range and said target speed in selected dimensional unit and indicating said relative target direction.

24. An apparatus for remotely determining the speed, range and relative direction of movement of a moving target comprising:

(a) a radio frequency transceiver operative to transmit a substantially continuous radio frequency signal periodically shifted between a first frequency and a second frequency toward a moving target, to receive target reflected signals related to said first and second frequencies, and to convert said target reflected signals related to said first and second frequencies respectively to a first doppler signal and a second doppler signal;

(b) phase angle means receiving said doppler signals and operative to measure the phase angle between said first and second doppler signals;

(c) doppler frequency means receiving one of said doppler signals and operative to measure the doppler frequency of said one of said doppler signals;

(d) target direction means receiving said doppler signals and operative to detect the phase lead/lag relationship between said first and second doppler signals;

(e) said target direction means including direction counter means receiving said first and seocnd doppler signals and generating a direction count related to said phase relationship between said doppler signals, said direction counter being related to a target relative direction of movement of said target with respect to said transceiver;

(f) direction control means receiving said first and second doppler signals and generating a direction control signal having a first logic level if said first doppler signal leads said second doppler signal in phase and a complementary second logic level if said second doppler signal leads said first doppler signal in phase;

(g) up/down direction counter means having said direction control means connected to an up/down control input and receiving one of said doppler signals at a clock input, said direction counter means counting the pulses of said one of said doppler signals over a selected period of time resulting in said direction count, said direction counter over said selected period of time indicating whether said target is approaching or moving away from said transceiver;

(h) controller means receiving signals representing said phase angle, said doppler frequency, and said phase relationship; said controller means scaling said phase angle to a target range and said doppler frequency to a target speed and converting said phase relationship to a relative target direction; and (i) display means connected to said controller means and displaying said target range and said target speed in selected dimensional units and indicating said relative target direction.

25. An apparatus for remotely determining the speed, range, and relative direction of movement of a moving target comprising:

(a) transmitter means positioned in a platform vehicle and including transmitter structure transmitting a radio frequency signal periodically shifted between a first frequency and a second frequency toward a moving target;

(b) receiver means positioned in said platform vehicle and including a receiver structure receiving a return signal including a roadway reflected signal component which is said radio frequency signal as reflected from objects on a roadway on which said platform vehicle is moving and a target reflected signal component which is said radio frequency signal as reflected from said target and to convert said return signal to first and second doppler signals related respectively to said first and second frequencies;

(c) platform filter means receiving said first and second doppler signals and separating therefrom a first platform doppler signal related to said first frequency and a second platform doppler signal related to said second frequency;

(d) target filter means receiving said first and second doppler signals and separating therefrom a first target doppler signal related to said first frequency and a second target doppler signal related to said second frequency;

(e) platform speed means connected to said platform filter means and measuring a platform doppler frequency of one of said platform doppler signals;
(f) platform direction means connected to said platform filter means and detecting the platform phase lead/lag relationship between said first and second platform doppler signals;
(g) target parameter means connected to said target filter means and deriving from said target doppler signals a target phase angle and a target phase lead/lag relationship between said first and second target doppler signals and a target doppler frequency of one of said target doppler signals;
(h) controller means receiving signals representing said platform doppler frequency, said platform phase relationships, said target phase angle, said target doppler frequency, and said target phase relationship; said controller means scaling said platform and target doppler frequencies respectively to a platform speed and a target relative speed, scaling said target phase angle to a target range, and converting said platform and target phase relationships respectively to a platform direction and a target direction; on said controller means mathematically combining said platform speed and said target relative speed in a manner determined by the relationship between said platform direction and said target direction resulting in a target absolute speed; and
(i) display means connected to said controller means and displaying said platform speed, said target range, said target absolute speed in selected dimensional units and displaying an indication of said target direction.

26. An apparatus as set forth in claim 25 wherein
(a) said platform speed means includes a platform doppler counter receiving one of said platform doppler signals and generating a platform doppler count which is the count of the pulses of said one platform doppler signal over a period of time, said platform speed being computed from said platform doppler count and the length of said period of time; and
(b) said platform direction means includes a platform direction counter receiving said first and second platform doppler signals and generating a platform direction count related to said platform phase relationship, said platform direction count being related to a relative direction of movement of said platform vehicle with respect to said roadway.

27. An apparatus as set forth in claim 25 wherein:
(a) said transmitter means and said receiver means comprise a forward transceiver means positioned to transmit said radio frequency signal in a forward direction of said platform vehicle;
(b) said apparatus includes a rear transceiver means substantially similar to said forward transceiver means and positioned to transmit said radio frequency signal in a rear direction of said platform vehicle; and
(c) said apparatus includes transceiver switch means operatively interconnected between said forward and rear transceiver means and said filter means and selectively operable to provide said first and second doppler signals from one of said transceiver means to said filter means.

28. An apparatus as set forth in claim 25 wherein:
(a) said platform filter means includes a pair of platform bandpass filter means; and
(b) said target filter means includes:
(1) a pair of low pass target filter means; and
(2) a pair of high pass target filter means; and
(c) said apparatus includes target filter selection means connected to said low pass filter means and said high pass filter means and operable to select the target doppler signals from one of said pairs of target filter means.

29. A method of remotely determining the speed, range, and relative direction of movement of a moving target comprising the steps of:
(a) transmitting a radio frequency signal toward a moving target;
(b) receiving a target reflected siganl which is said radio frequency signal as reflected from said target;
(c) processing said target reflected signal to derive a target range;
(d) processing said target reflected signal to derive a target speed;
(e) processing said target reflected signal to determine a period of said target reflected signal, and vertifying the consistency of said period independent of amplitude;
(f) processing said target reflected signal to derive a relative target direction;
(g) displaying said target speed and said target range after verifying said consistency of said period of said target reflected signal in selected dimensional units; and
(h) displaying an indication of said relative target direction.

30. A method of remotely determining the speed, range, and relative direction of movement of a moving target comprising the steps of:
(a) transmitting a radio frequency signal from a moving platform vehicle toward a moving target;
(b) receiving a return signal on said platform vehicle, said return signal including a roadway reflected signal component which is said radio frequency signal as reflected from stationary objects along a roadway on which said platform vehicle is moving and a target reflected signal component which is said radio frequency signal as reflected from said target;
(c) isolating a roadway reflected signal and a target reflected signal from said return signal;
(d) processing said roadway reflected signal to derive a platform speed with respect to said roadway;
(e) processing said target reflected signal to derive:
(1) a target range with respect to said platform vehicle;
(2) a relative target speed with respect to said platform vehicle; and
(3) a target direction with respect to said platform vehicle;
(f) mathematically combining said relative target speed and said platform speed in a manner determined by the relationship of said target direction to derive an absolute target speed with respect to said roadway;
(g) displaying said platform speed, said absolute target speed, and said target range in selected dimensional units; and
(h) displaying an indication of said target direction.

31. A method of remotely determining the speed and range of a moving target from a moving platform and comprising the steps of:
  (a) substantially continuously transmitting a radio frequency signal toward a moving target;
  (b) receiving a composite reflected signal which is said radio frequency signal as reflected from said moving target and a roadway reflected signal which is said radio frequency signal as reflected from stationary objects along a roadway on which said moving platform is traveling;
  (c) processing said roadway reflected signal to derive a platform vehicle speed;
  (d) processing said target reflected signal to derive a relative target speed which is the speed of said target relative to said platform vehicle;
  (e) processing said target reflected signal to derive a target range;
  (f) mathematically combining said relative target speed and said platform speed to derive a target absolute speed; and
  (g) displaying said target absolute speed as said target speed and displaying said target range.

32. A method of remotely determining the speed, range, and relative direction of movement of a moving target comprising the steps of:
  (a) transmitting a radio frequency signal toward a moving target;
  (b) receiving a target reflected signal which is said radio frequency signal as reflected from said target;
  (c) periodically alternating the frequency of said radio frequency signal between a first frequency and a second frequency;
  (d) converting a first component of said target reflected signal which is related to said first frequency to a first doppler signal;
  (e) converting a second component of said target reflected signal which is related to said second frequency to a second doppler signal;
  (f) measuring the phase angle of the phase difference between said first and second doppler signals;
  (g) scaling said phase angle to derive a target range;
  (h) alternating the frequency of said radio frequency signal between said first and second frequencies if said target range is greater than a selected range;
  (i) alternating the frequency of said radio frequency signal between a third frequency and a fourth frequency if said target range is not greater than said selected range;
  (j) processing said target reflected signal to derive a target speed;
  (k) processing said target reflected signal to derive a relative target direction;
  (l) displaying said target range and said target speed in selected dimensional units; and
  (m) displaying an indication of said relative target direction.

33. A method of remotely determining the speed, range and direction of a moving target from a moving platform and comprising the steps of:
  (a) transmitting a radio frequency signal toward a moving target;
  (b) receiving a composite reflected signal which is said radio frequency signal as reflected from said moving target and a roadway reflected signal which is said radio frequency signal as reflected from stationary objects along a roadway on which said moving platform is traveling;
  (c) processing said roadway reflected signal to derive a platform vehicle speed;
  (d) processing said roadway reflected signal to derive a platform vehicle direction;
  (e) processing said target reflected signal to derive a relative target speed which is the speed of said target relative to said platform vehicle;
  (f) processing said target reflected signal to derive a relative target direction;
  (g) mathematically combining said relative target speed and said platform speed in a manner determined by the relationship of said target direction and said platform direction to derive a target absolute speed;
  (h) processing said target reflected signal to derive a target range;
  (i) displaying said target range and said target speed in selected dimensional units; and
  (j) displaying an indication of said relative target direction.

* * * * *